May 2, 1944.  T. PETERSEN  2,347,793
CHEESE PRESS
Filed Sept. 15, 1941   3 Sheets-Sheet 1

Inventor:
Thorkild Petersen.
By Chritton, Wiles, Davies & Hirsch.
Attys.

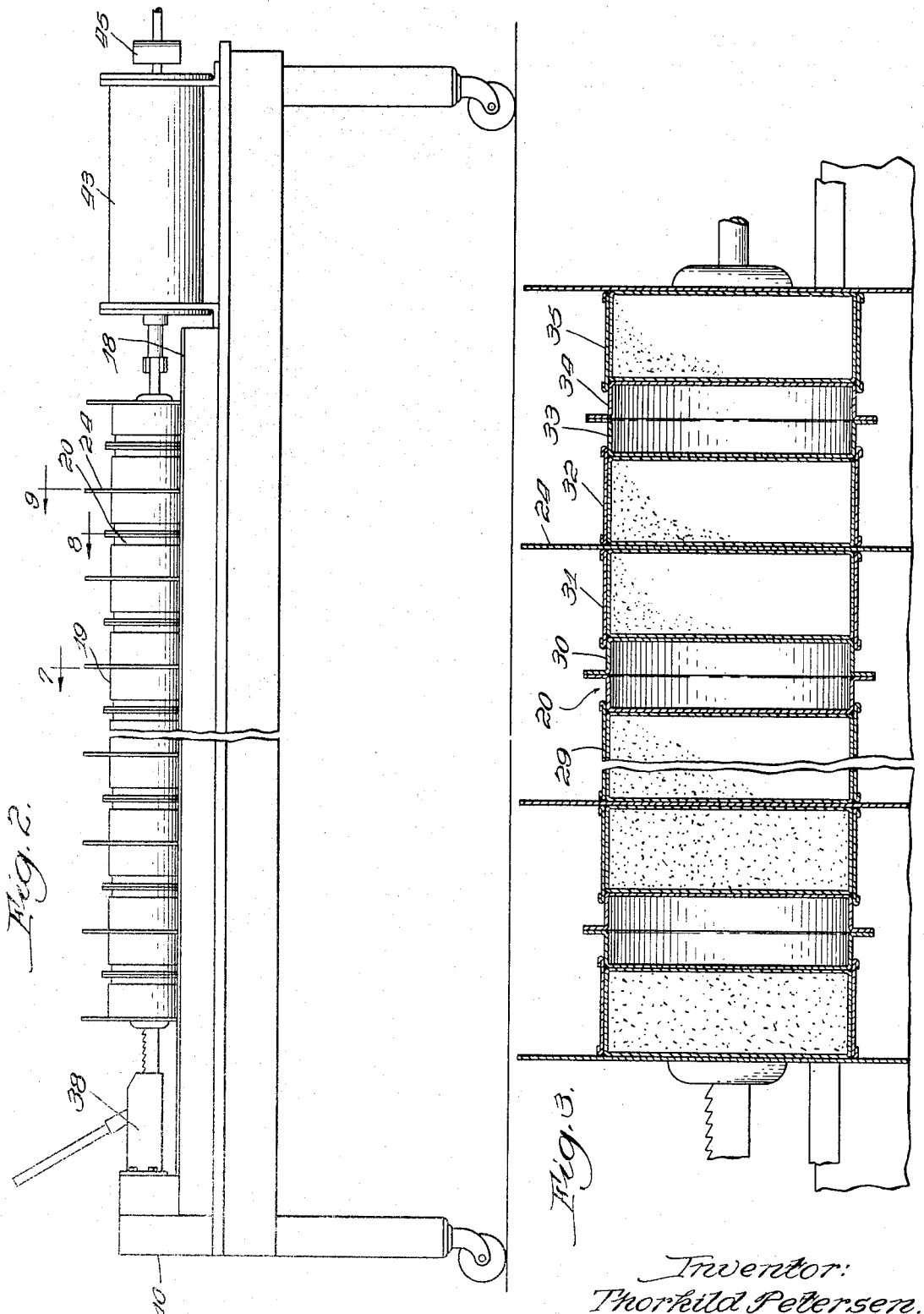

May 2, 1944.　　　　T. PETERSEN　　　　2,347,793
CHEESE PRESS
Filed Sept. 15, 1941　　　　3 Sheets-Sheet 3

Inventor:
Thorkild Petersen.
By Chritton, Wiles, Davies & Hirschl.
Attys.

Patented May 2, 1944

2,347,793

UNITED STATES PATENT OFFICE 2,347,793

CHEESE PRESS

Thorkild Petersen, Elgin, Ill., assignor to Pure Milk Cheese Co., a corporation of Illinois Application September 15, 1941, Serial No. 410,924

10 Claims. (Cl. 100—55)

This invention relates to a cheese press, and more particularly to an improved arrangement of hoops, followers, and guiding and supporting means therefor.

Figure 1:
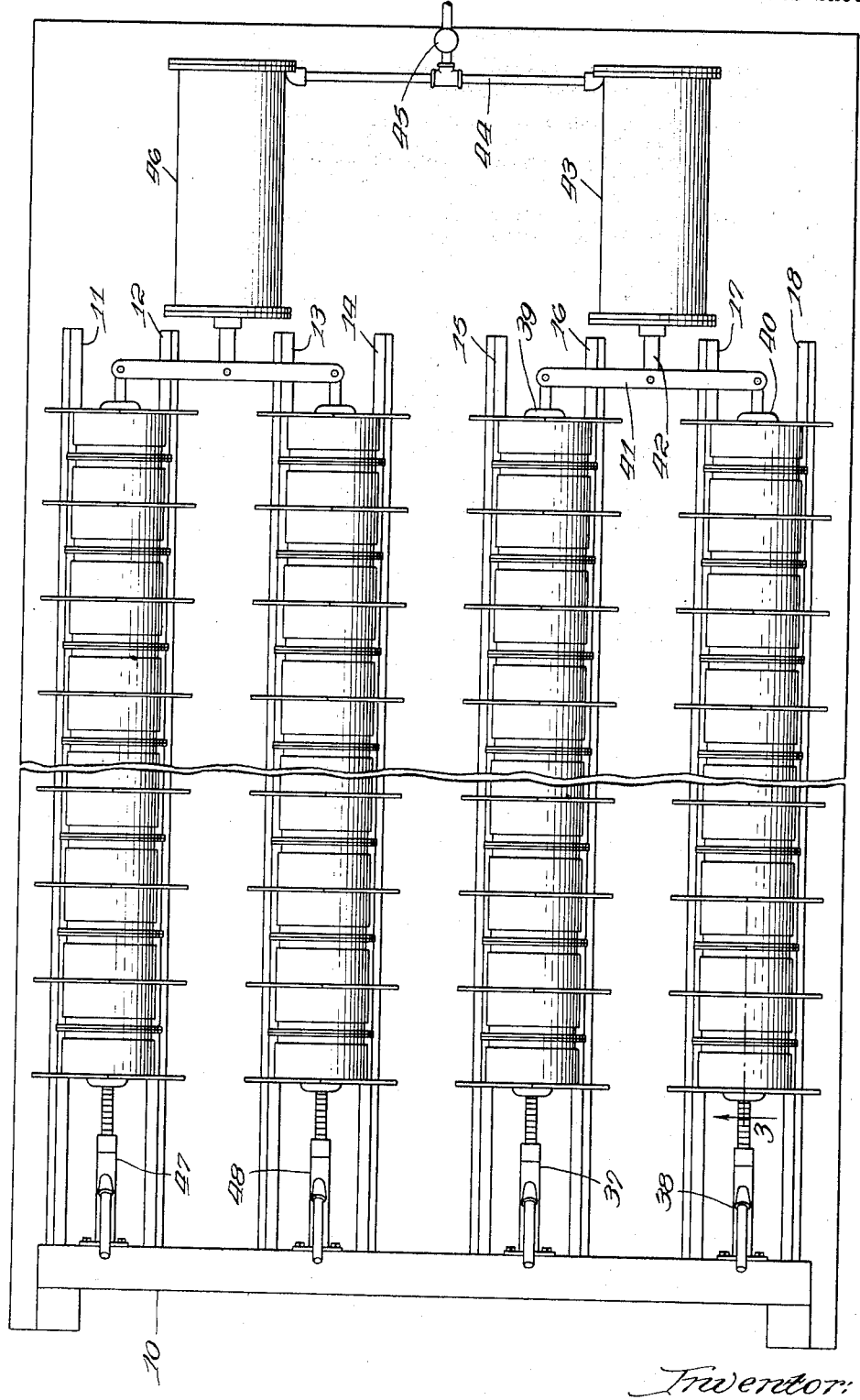
Figure 4:
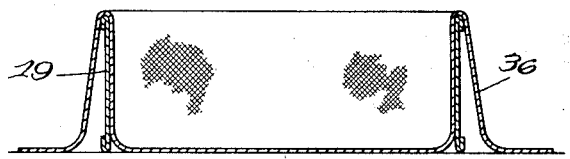
Figure 5:
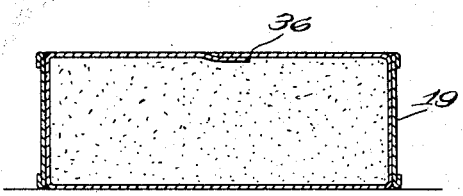
Figure 6:
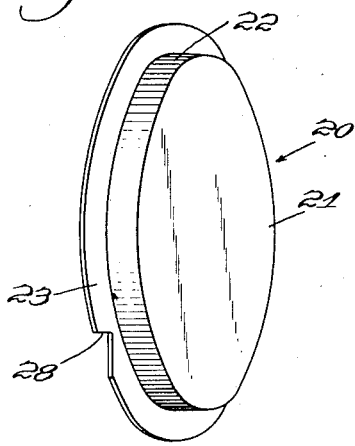
Figure 7:
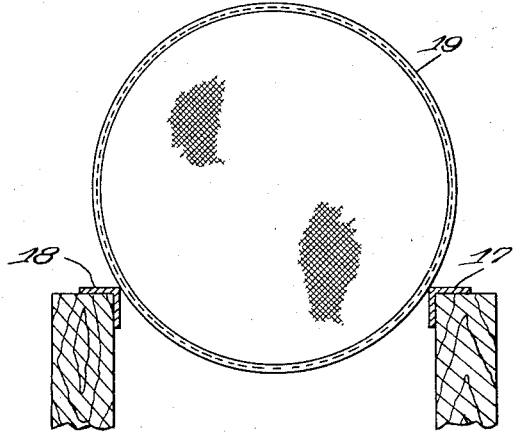
Figure 8:
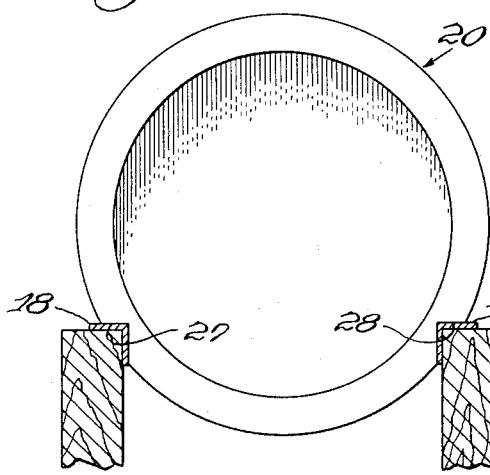
Figure 9:
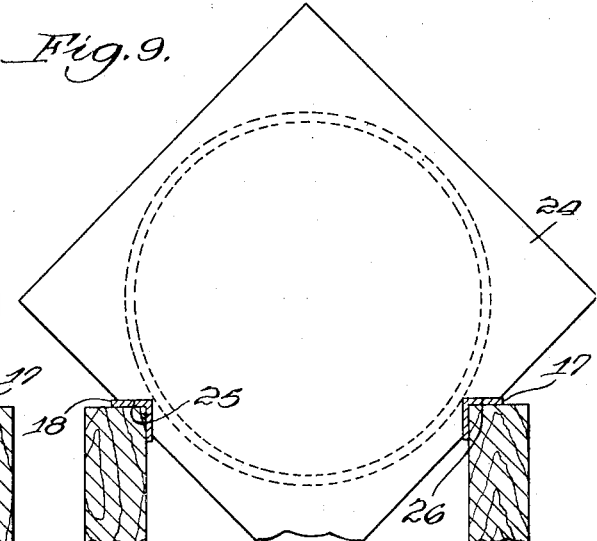

One feature of this invention is that it effects more uniform and rapid pressing of cheese wheels; another feature of this invention is that it eliminates turning or other handling of the cheeses during pressing; still another feature of this invention is an improved form of follower adapted to maintain proper alignment with its cooperating hoop, and to abut against another follower without the necessity of an intermediate plate; yet another feature of this invention is the provision of means for distributing the pressure of a single hydraulic cylinder uniformly between the contents of two sets of guide means; a further feature of this invention is the provision of independently adjustable manually operable pressure-applying means associated with each row of cheeses to be pressed; other features and advantages of this invention will be apparent from the following specification and the drawings, in which:

Figure 1 is a top plan view, partly broken away, of a press embodying my invention; Figure 2 is a side elevational view of the apparatus shown in Figure 1; Figure 3 is a vertical sectional view through one of the rows of cheeses, along the line 3 of Figure 1; Figure 4 is a vertical sectional view of a hoop with the cheese wheel placed therein; Figure 5 is a similar view with the cheesecloth folded over the upper surface of the cheese; Figure 6 is a perspective view of one of my improved followers; Figure 7 is a fragmentary vertical view, along the line 7 of Figure 2, showing the position of a hoop on the guide rails; Figure 8 is a similar view, along the line 8 of Figure 2, showing the way in which one of the followers is supported on the guide rails; and Figure 9 is a view along the line 9 of Figure 2, showing the way in which one of the presser plates is supported on the guide rails.

In making cheese wheels of the proper firmness to cure in appropriate cellars, it is necessary that the cheese wheel which has knit into a fairly firm mass be pressed to further compact it to the desired density. This is particularly true in connection with the natural cheese with which I am particularly concerned and with which I use the press here disclosed, such cheese being formed into relatively small wheels more readily salable in the present market, the amount and character of the pressing being fairly critical if a good quality of cheese is to be obtained.

Presses heretofore used have generally been of the vertical type, where cheeses (in hoops and with cooperating followers) were piled on top of each other and some particular weight applied to the top of the pile. In such presses the pressure is not uniformly distributed, the cheeses at the bottom of the pile receiving a high pressure and those at the top of the pile an undesirably low pressure, so that they do not react the same to the subsequent curing process. Moreover, with such presses it is necessary that the cheeses be pressed for a considerable period, as fourteen hours, and that they be turned over at least once during such pressing.

I have developed and am here disclosing and claiming an improved type of press which operates horizontally, so that all of the cheeses receive uniform pressure, and which is able to properly press the cheeses in about half the time heretofore necessary, without any turning, and with a better and more even distribution of moisture content. Moreover, I have provided an improved follower which is adapted to be supported on the same guide rails as the hoops, which maintains itself in perfect alignment with the hoops, and which is adapted to abut against another follower as the pressure is applied, without the necessity of an intermediate spacer or presser plate.

In the particular embodiment of my invention illustrated herewith the press comprises a bed or frame 10 supporting four parallel guide means each comprising a pair of spaced parallel horizontally arranged guide rails, here indicated by the reference numerals 11 to 18, inclusive. Each pair of guide rails and the arrangement of the hoops, followers, and plates thereon, correspond to the others, so that only one such arrangement will be described in detail.

In a commercial embodiment of my press, as may be better seen in Figures 7, 8 and 9, the guide rails comprise wooden frame members covered, on the edges adapted to support the hoops, followers and plates, with angle irons, these being spaced seven and one-half inches. The rails are adapted to support cheese hoops, as the hoop 19, these hoops being of sheet metal with an eight and three-fourths inch outer diameter and a three and one-fourth inch depth. Followers, as the follower 20, are also adapted to be supported by the guide rails, and to cooperate with a particular hoop. These followers are of integral sheet metal construction and comprise a circular portion in turn comprising a disc-like bottom part 21 of about eight and three-eighths inch outer diameter, and an annular rim part 22 extending vertically therefrom to a height of about one and one-eighth inch; and an annular outwardly extending flange portion 23, this portion extending out around the rim for about three-fourths of an inch. The guide rails are also adapted to support intermediate presser plates 24, as may be seen in Figure 9, these plates being square in my particular commercial embodiment, and provided with notches 25 and 26 adapted to receive the channel irons on the guide rails. It will be understood, of course, that the foregoing specific dimensions are merely given as illustrative of one particular form of this invention, and in order to better show the preferred relation between the parts, and that my invention could be equally well embodied in apparatus of a different size.

As may be best seen in Figure 7, the hoops, as 19, are laid on the cooperating guide rails and supported directly thereon by contact of their outer circumference therewith. The followers, on the other hand, are provided with notches 27 and 28 in their annular flanges, as 23, which do not extend clear into the circular portion of the follower. The depth of these notches bears a definite relation to the size of the hoops, however, and the apices of the notches 27 and 28 should be a distance from the center of the circular portion which just equals the outer radius of the hoops.

Referring now more particularly to Figure 3, it will be seen that the circular portions of the followers are adapted to be snugly but slidably received within the hoops, and the followers are adapted to abut each other in what may be termed back-to-back relationship. That is, the follower 20 is adapted to have its circular portion slidably received within the hoop 29, and to have its flange portion abut against the flange portion of another follower 30 having its circular portion at least partly received within the hoop 31. The hoop 31 is separated from another hoop 32 by the plate 24, and then there is another pair of followers 33 and 34 arranged with their flanges abutting in the junction between the hoop 32 and the hoop 35. The use of the notched flanges as means for supporting the followers on the guide rails causes the circular portions thereof to be coaxial with the hoops, as is necessary if these parts are to be horizontally movable along the guide rails on which they are supported, and if proper alignment of the circular portion with its cooperating hoop is to be obtained. Moreover, since the followers can be placed back-to-back, they provide the spacing between alternate junctures of the hoops, plates only being necessary between the other junctures. It will thus be seen that the improved follower here shown not only achieves its normal function of moving down into the cheese ring to compress the cheese therein, but also provides a simple follower readily supported in proper alignment with the hoops, and because of the broad flanges, enabled to be placed back-to-back.

It will be understood that the cheese wheels, formed in a manner which is no part of the present invention, are first placed within cheesecloth in a hoop, as in the hoop 19 shown in Figure 4, the cheesecloth 36 then being folded over as shown in Figure 5. A plate is first placed at one end of one of the pairs of guide rails, and then the hoop laid in place therein immediately adjacent it. Next a pair of followers would be placed on the rails back-to-back, then another hoop and cheese placed thereon. A plate would then be placed against this last hoop, and the process repeated until the entire guide rail would be filled, this requiring about sixty cheeses in the particular commercial embodiment of my press which I have been describing. Assuming that the two bottom pairs of guide rails shown in Figure 1 have been properly filled, the next step would be to manually apply pressure to one end of the row of cheeses by the mechanical jacks 37 and 38 individual to each such row at one end thereof. Presser feet 39 and 40 are adapted to apply pressure to the other ends of these rows, these feet being pivotally connected to a cross bar or pressure distributing bar 41, which bar is centrally pivotally connected to the connecting rod 42 extending out of the end of the hydraulic cylinder 43, this rod being longitudinally slidable and having a conventional piston on its other end within the cylinder. The outer end of the cylinder 43 is adapted to be supplied with any desired operating fluid through the pipe 44.

I have found that a convenient way of securing the desired pressure is to deliver water from a conventional source of supply, through a pressure regulating valve 45 which reduces its pressure to the neighborhood of 10 to 15 pounds per square inch, to the hydraulic cylinders 43 and 46. The cylinders preferably have an internal diameter of 8 to 10 inches, so that each cylinder develops a total pressure of 700 to 1,000 pounds which is then divided by the cross bar between the two rows of cheeses upon which it acts. The provision of the individually adjustable manually operable jacks 37 and 38 enables the slack in the rows of cheeses to be taken up and any initial differences in the length of the rows to be compensated for at this end, so that the rows are even at the other end and as close to the hydraulic cylinder as possible, in order to give it its full length of stroke for follow-up as the cheeses compress. The arrangement of the other two pairs of guide rails and their operating hydraulic cylinder 46 and mechanical jacks 47 and 48 are, of course, similar.

I have found that this apparatus provides a particularly convenient and efficient method of pressing cheeses, and that the ability to use high initial pressure (uniform throughout all the cheeses) results in a more uniform cheese at the end of the pressing operation, and a much shorter presser operation, without the necessity of turning the cheeses. In the vertical presses which I previously used I found as much as five per cent difference in moisture content between different parts of a single cheese, whereas cheeses in this form of press show an average moisture differential of about only one-half of one per cent, and never more than one per cent, between different parts of the same cheese.

While I have shown and described a single embodiment of my invention, it is to be understood that it is capable of many modifications. Changes, therefore, in the construction and arrangement may be made without departing from the spirit and scope of the invention as disclosed in the appended claims.

I claim:

1. Apparatus of the character described for pressing cheese, including: a plurality of hoops adapted to receive the cheeses to be pressed; a pair of spaced parallel guide rails for supporting the hoops with their axes horizontal; a plurality of followers equal in number to the number of hoops, each follower being of sheet metal and having a circular portion adapted to be received within the hoop with which it cooperates and another portion adapted to engage said guide rails to support the followers with their circular portions coaxial with the hoops, both the hoops and followers being horizontally movable along said guide rails; and pressure applying means adapted to force the followers at least partly within their cooperating hoops to press said cheeses.

2. Apparatus of the character described for pressing cheese, including: a plurality of hoops adapted to receive the cheeses to be pressed; a pair of spaced parallel guide rails for supporting the hoops with their axes horizontal; a plurality of followers equal in number to the number of hoops, each being of sheet metal and having a circular portion adapted to be received within the hoop with which it cooperates and an annular flange portion of substantial width provided with notches for engagement with said guide rails to support the followers with their circular portions coaxial with the hoops, both the hoops and followers being horizontally movable along said guide rails; and pressure applying means adapted to force the followers at least partly within their cooperating hoops to press said cheeses.

3. A follower of the character described adapted to cooperate with a hoop for pressing cheeses, including: a circular portion adapted to be snugly but slidably received within the hoop, said portion comprising a disc-like bottom part and an annular rim at right angles thereto; and an annular flange portion extending out at right angles from the edge of the rim spaced from the bottom.

4. Apparatus of the character claimed in claim 3, wherein said follower comprises a single integral piece of sheet metal.

5. Apparatus of the character claimed in claim 3, wherein the flange portion is provided with notches for engagement with guide rails.

6. A horizontal cheese press of the character described, including: a pair of spaced parallel guide means, each adapted to support and guide cheese hoops and their cooperating followers; pressure applying means; and pivotable means for distributing the pressure of said means uniformly between the contents of each of said guide means.

7. Apparatus of the character described for pressing cheese in a press having guide means and pressure applying means, including: a plurality of hoops adapted to receive the cheeses to be pressed; an equal number of followers, each having a circular portion adapted to be received within the hoop with which it cooperates and another portion adapted to engage said guide means to support the follower with its circular portion coaxial with the hoop, the hoops and followers being horizontally movable along said guide means; and plates interleaved between certain of the hoops.

8. Apparatus of the character described for pressing cheese in a press having a pair of spaced parallel guide rails and pressure applying means, including: a plurality of hoops adapted to receive the cheeses to be pressed; an equal number of followers, each having a circular portion adapted to be received within the hoop with which it cooperates and an annular flange portion of substantial width provided with notches for engagement with said guide rails to support the followers with their circular portions coaxial with the hoops, both the hoops and followers being horizontally movable along said guide rails and the followers being adapted to be at least partly forced within their cooperating hoops by the pressure applying means, the followers being arranged in pairs with their flanges abutting at alternate hoop junctures; and plates interposed between adjacent hoops at the other hoop junctures.

9. Pressure apparatus for a horizontal cheese press of the character described having two spaced parallel horizontally arranged guide means, each such means being adapted to support and guide cheese hoops and their cooperating followers, including: a hydraulic cylinder for applying pressure to the cheeses; and a pivotable cross bar for distributing the pressure of said cylinder uniformly between the contents of each of said guide means.

10. Pressure apparatus for a horizontal cheese press of the character described having two pairs of spaced parallel horizontally arranged guide means, each pair being adapted to support and guide cheese hoops and their cooperating followers, including: a hydraulic cylinder for applying pressure to one end of each of two rows of hoops and followers; a pivotable cross bar for distributing the pressure of said cylinder uniformly between the contents of each of said guide means; and independently adjustable manually operable means for applying pressure to the other end of each of said rows.

THORKILD PETERSEN.